Nov. 19, 1963  A. J. ACOSTA  3,111,142
FLOW CONTROL MECHANISM
Filed Dec. 30, 1960  2 Sheets-Sheet 1
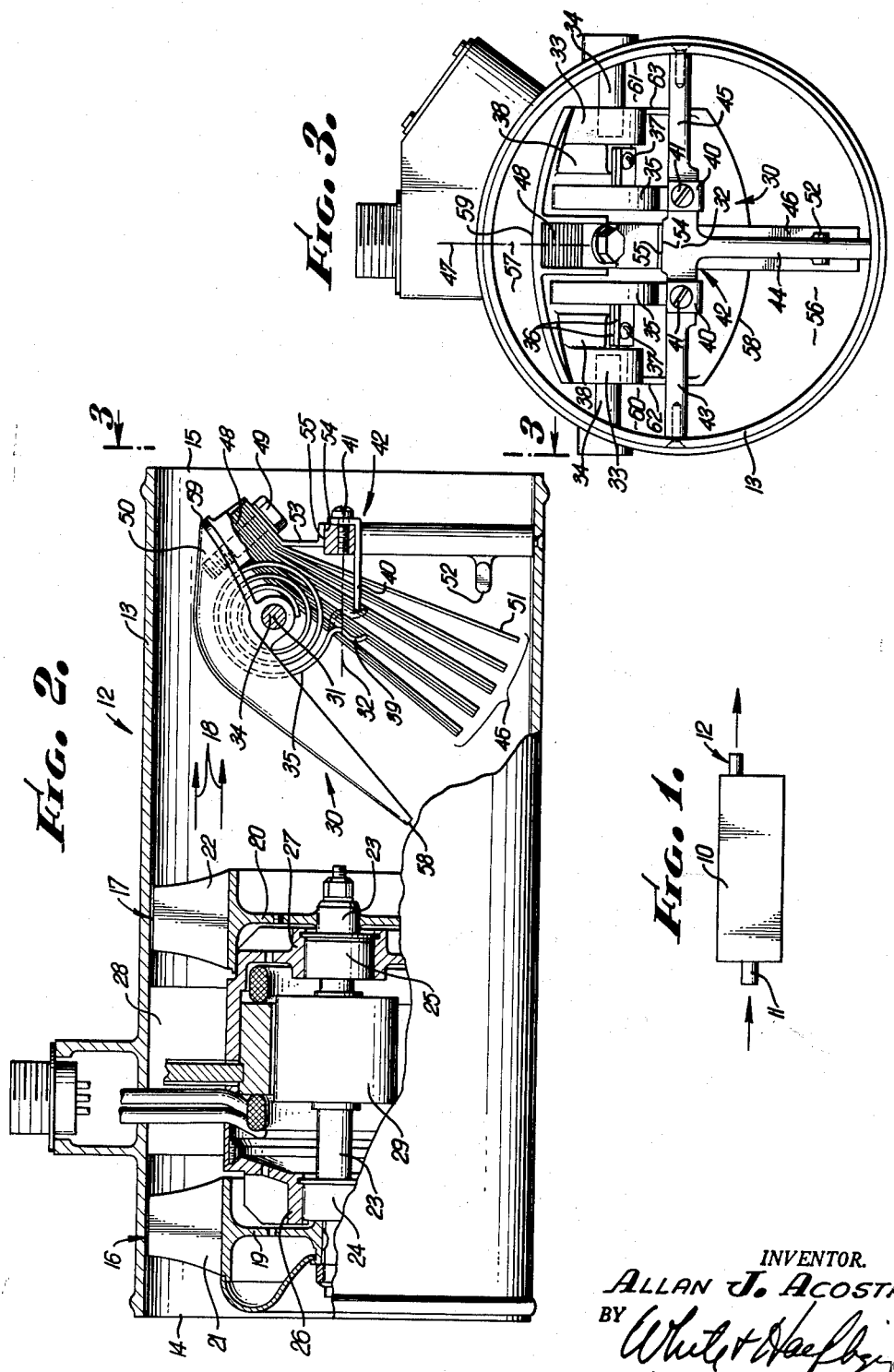
INVENTOR.
ALLAN J. ACOSTA
BY
ATTORNEYS.

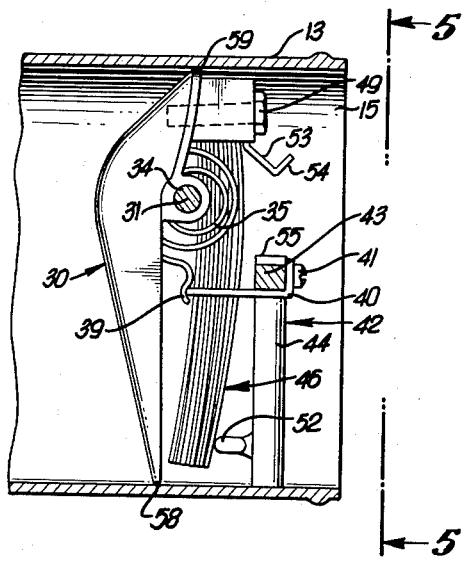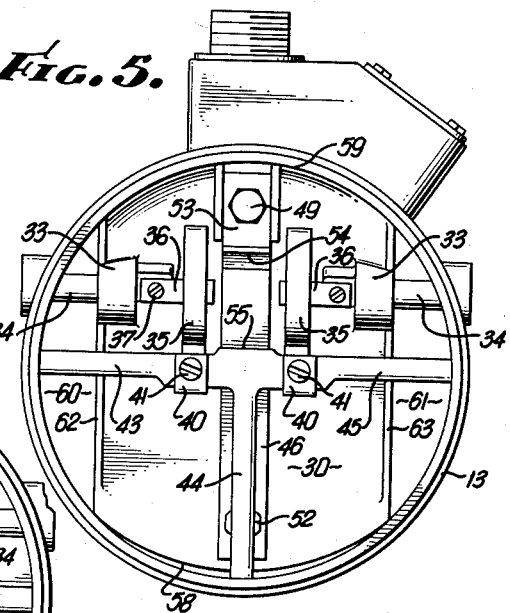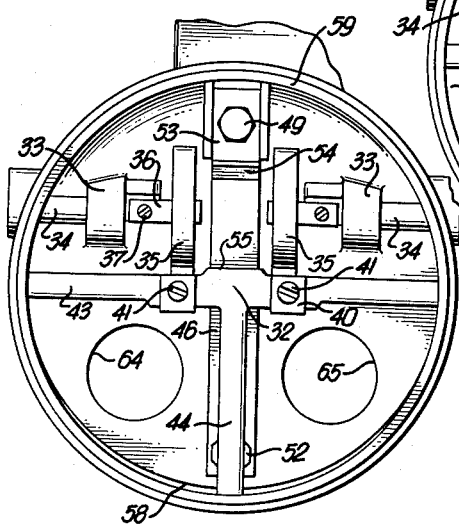

United States Patent Office 3,111,142
Patented Nov. 19, 1963

3,111,142
FLOW CONTROL MECHANISM
Allan J. Acosta, Altadena, Calif., assignor to The Task Corporation, Anaheim, Calif., a corporation of California
Filed Dec. 30, 1960, Ser. No. 79,784
6 Claims. (Cl. 138—46)

This invention relates generally to apparatus for controlling gas flow between upstream and downstream zones at higher and lower pressures respectively. More specifically, it concerns improvements in flow control assemblies characterized as functioning to maintain substantially constant the mass flow of air between such zones.

In the maintenance of aircraft cabin pressurization it is desirable to maintain a condition of substantially constant mass flow of air into and out of the cabin pressurization zone for proper ventilation. This condition must be maintained for all design flight altitudes, requiring the use of a device for controlling the escape of air from the constant pressure cabin to the exterior where the air pressure drops with increasing altitude. Known flow control devices seek to maintain a constant mass discharge flow of air through the use of butterfly type valves which move to decrease the flow area in a discharge conduit in response to an increasing tendency of the air in the upstream zone to escape to the exterior, due to lowering of exterior air pressure with altitude.

Such known butterfly valves have limiting positions at which all escaping air flows through a reduced or "fixed" orifice or orifices adjacent edge extent of the valve having maximum travel in the conduit, the escaping flow then being supersonic so that the mass flow is constant as determined by the difference between the cabin or upstream air pressure and the exterior or downstream pressure. Accordingly, the "fixed" orifice is made of such size as will pass a particular mass flow at supersonic conditions such as is desirable for ventilation purposes. However, due to physical requirements including the use of a movable spring for biasing the valve, and which extends in the direct path of the escaping air flow, the "fixed" orifice must be made adjustable and calibrated in each instance to limit the closure of the butterfly valve at that point for which the design mass flow results under supersonic air flow conditions. This requirement introduces the need for an adjustable stop means and increases the risk of malfunction of the valve and the adjustable stop means, including dangerous complete closure of the butterfly valve, so that definite problems exist as respects equipment of this type.

The present invention is directed to a solution of the problems discussed above, and is predicated in part upon the insight that the flow under supersonic conditions may be passed from the upstream to the downstream side of the valve through orifice means which is auxiliary to the variable area main orifice, and furthermore which has flow area which remains substantially independent of valve movement as the valve moves to substantially shut off the flow through the main orifice. As conceived in one of its specific forms, the auxiliary orifice means comprises a pair of orifices formed between the conduit means and transversely spaced opposite edge portions of the damper or butterfly valve which is mounted to rotate about a transverse axis in the conduit means. In another form, the auxiliary orifice means extends through the damper or butterfly valve, within the interior of the conduit means. Accordingly, there is no need for adjustable stop means to limit shutting of the damper, and the escaping supersonic flow may approach and pass through or around the closed damper at locations which are transversely spaced from the centered biasing means acting to resist closing of the damper.

These and other objects and advantages of the invention, as well as the details of illustrative embodiments, will be more fully understood from the following detailed description of the drawings, in which:

FIG. 1 is a schematic showing of an aircraft cabin air pressurizing and dumping system;

FIG. 2 is a sectional elevation partly broken away to show the interior of the air flow control apparatus;

FIG. 3 is an end view taken on line 3—3 of FIG. 2;

FIG. 4 is a view like FIG. 2 but showing only the valving means in the flow conduit and in closed position;

FIG. 5 is an end view taken on line 5—5 of FIG. 4; and

FIG. 6 is a view like FIG. 5 showing a modified control.

In FIG. 1 the aircraft cabin is schematically shown at 10, and pressurizing equipment is shown at 11 for introducing air into the cabin to maintain the interior of the latter at desired pressure. For ventilation purposes, it is desirable that there be a predetermined mass flow of air into and out of the cabin 10 while the latter is kept under desired pressurization. Accordingly, an air dumping and flow control apparatus is shown at 12 for controlling gas flow between an upstream zone, i.e. the interior of the cabin, and a downstream zone, as for example the exterior.

One form of improved apparatus 12 is shown in FIG. 2 to comprise an assembly that includes a flow conduit 13 having an upstream entrance end 14, and a downstream exit end 15. Air entering the conduit at 14 passes first through axial blower stages generally indicated at 16 and 17 and operable to compress the air for rightward discharge as indicated by the arrows 18. The axial blowers 16 and 17 may comprise hubs 19 and 20 mounting suitable vanes 21 and 22, and being mounted on a common shaft 23. The latter is supported for rotation by bearings 24 and 25 within stationary structures 26 and 27 joined at 28 to the conduit 13. The structure 28 may comprise fixed vanes circularly spaced about the shaft 23 for guiding the flow between the first and second blower stages. A suitable electric motor is shown at 29 for rotating the shaft 23.

Located downstream of the last blower stage 17 and within the conduit 13 is a valving means, typically in the form of a damper or butterfly valve 30 having a generally convex side facing upstream within the conduit. The valve is mounted to rotate about an axis 31 extending transversely of the conduit and eccentrically offset from the conduit axis 32. For this purpose, the valve is provided with integral bearings 33 at the downstream side thereof, the bearings being located in transversely spaced apart relation as best seen in FIGS. 3 and 5. The bearings in turn receive the inwardly projecting terminal ends of trunnions 34 integral with the flow conduit means, and the trunnions and bearings have a common axis 31. Accordingly, the valve is rotatable from an open position as shown in FIG. 3 to a fully closed position as shown in FIG. 4.

Such rotation of the valve toward closed position occurs in response to air stream loading exerted against the upstream facing side of the valve, and it will be understood that rotation of the valve toward closed position is resisted by structure now to be described. As best shown in FIGS. 2 and 3, a pair of coil springs 35 are located in transversely spaced apart relation at the downstream side of the valve 30, and each spring has its innermost end retained between a pair of transversely extending plates 36. The transverse terminal end portions of the plates are joined by connectors 37 to flanges 38 integral with the bearings 33 on the valve, and accordingly the coil springs 35 are rotated with the valve. The outer terminal ends of the coil springs 35 are shown at 39 in FIG. 2 as being rotatable into engagement against the upstream projecting ends of brackets 40, the latter being held in fixed position relative to the flow conduit 13 by connection at 41 to a spider 42. The latter has arms 43, 44 and 45, the terminal ends of which are connected to the flow conduit as shown. Accordingly, once the terminal ends 39 of the coil springs come into engagement with the bracket 40, further closing movement of the damper valve is increasingly resisted by the coil springs.

Additional resistance to closing of the damper valve is provided by a series of leaf springs 46 generally centered with respect to a vertical plane 47 through the axis 32 and at the downstream side of the damper valve. The springs 46 have their uppermost ends 48 integrally connected at 49 to the upper extent 50 of the damper valve, whereas the downwardly projecting extents of the springs are relatively spaced apart, as shown, in the path of damper movement toward closed position. Accordingly, as the damper so moves, the lower extents of the springs 46 rotate counterclockwise in FIG. 2, and are drawn slightly upwardly. This spring movement is progressively arrested after spring 51 engages the stop 52 since the leaf springs 46 progressively close together in sequence after spring 51 has engaged the stop 52, the final stacked relation of the leaf springs being shown in FIG. 4. The latter also shows the flexed condition of the leaf springs which contributes to the increasing resistance to closing movement of the damper valve. A bracket 53 integrally connected at 49 to the damper valve upper extent 50 has a shoulder 54 adapted to seat against upper facing shoulder 55 on the spider 42 to limit opening movement of the valve as shown in FIGS. 2 and 3.

A pair of main orifices are seen to be formed in FIG. 3 at 56 and 57 between the bore of the conduit 13 and the lower and upper terminal edges 58 and 59 of the damper. As the damper progressively closes within the conduit it is clear that the flow areas of these main orifices are decreased until they are substantially eliminated as seen in FIG. 5. Coming now to the particular novel features of the invention, auxiliary orifices are formed at 60 and 61 between the bore of the conduit and transversely opposite edges 62 and 63 of the damper, and it will be understood that the flow areas of these auxiliary orifices remain substantially independent of movement of the valving means, particularly as the damper nears its closed position. It will also be observed that the orifices 61 and 62 are located remotely from the coil springs 35 and leaf springs 46, so that the flow through the auxiliary orifices has minimum disturbance after escaping therethrough. Finally, it appears that the edge portions 62 and 63 of the damper valve move in transversely spaced planes that extend substantially normal to the transverse axis 31. When the damper valve is closed as shown in FIG. 4, the flow escapes through the auxiliary orifices 60 and 61 under supersonic flow conditions whereby the mass flow is determined by the difference in pressure at the upstream and downstream sides of the closed valve.

FIG. 6 shows the same basic arrangement of components as previously described, with the same identifying numbers appearing thereto. The principal difference lies in the elimination of the orifices 60 and 61, and the provision of auxiliary orifices 64 and 65 which extend through the damper within the interior of the conduit. The auxiliary orifices 64 and 65 are of equal size and are located at transversely opposite sides of a vertical plane through the conduit axis 32. Furthermore, the orifices 64 and 65 are circular, and they are so located as to direct the flow through the closed damper and away from the spring structure and spider arrangement at the downstream side of the valve.

I claim:

1. In apparatus for controlling gas flow between upstream and downstream zones, an improved flow control assembly comprising flow conduit means communicable with said zones and valving means movable in the conduit means to decrease the flow area of main orifice means formed by said assembly within said conduit means all in response to increasing differential gas pressure upstream and downstream of said valving means, means in the conduit for resisting said valving means movement and including coil and leaf springs at the downstream side of the valving means and mounted to pivot with the valving means in the conduit, stop means in the pivot path of said springs, power driven means upstream of said valving means and operable to displace gas downstream against said valving means, and said assembly forming auxiliary orifice means within the conduit means for passing gas flowing from the upstream side to the downstream side of said valving means, the flow area of said auxiliary orifice means remaining substantially independent of movement of said valving means as the valving means moves to substantially shut off the flow through said main orifice means, whereby as said differential gas pressure increases the amount of gas passing through said auxiliary orifice means increases in relation to the amount of gas passing through said main orifice means, said valving means having a terminal position in which said main orifice means is substantially closed at times when the flow through said auxiliary orifice means is supersonic.

2. In apparatus for controlling gas flow between upstream and downstream zones, an improved flow control assembly comprising flow conduit means communicable with said zones and valving means including a damper mounted for pivotal movement about an axis extending generally transversely of said conduit means and having different edge portions cooperating with said conduit means to form main and auxiliary orifice means, a pair of auxiliary orifices being located at transversely spaced opposite edge portions of the damper, said valving means being movable in the conduit means to decrease the flow area of the main orifice means all in response to increasing differential gas pressure upstream and downstream of said valving means, said conduit means having a principal axis with respect to which said damper pivot axis is eccentrically spaced, means in the conduit for resisting said valving means movement and extending in the space between said damper pivot axis and a plane extending parallel to said damper pivot axis and containing said principal axis, said last named means including a series of leaf springs extending within the downstream projected area of the damper and in such spaced apart relation in the path of damper pivotal movement toward a terminal position as to be successively deflected in response to said damper movement, power driven means upstream of said valving means and operable to displace gas downstream against said valving means, the flow area of said auxiliary orifice means remaining substantially independent of movement of said valving means as the valving means moves to substantially shut off the flow through said main orifice means, whereby as said differential gas pressure increases the amount of gas passing through said auxiliary orifice means increases in relation to the amount of gas passing through said main orifice means, said main orifice mean being substantially closed at times when the damper is at said terminal position and the flow through said auxiliary orifice means is supersonic.

3. The invention as defined in claim 2, including means mounting said damper for pivotal movement and of which only a pair of relatively narrow mounting members extend transversely directly downstream of said auxiliary orifices.

4. For combination with an aircraft chamber to which air is supplied for pressurization at different altitudes, an improved assembly for controlling discharge flow of gas from said chamber to the exterior, said assembly comprising a flow conduit communicable with said chamber and the exterior, a valve in the form of a damper mounted for pivotal movement in lengthwise extent of the conduit to decrease the flow area of main orifices within said conduit all in response to increasing differential air pressure upstream and downstream of the valve, the valve having a pivot axis generally transverse of the conduit lengthwise extent, said main orifices being formed between the conduit bore and terminal edges of the valve respectively spaced upstream and downstream from said pivot axis when the valve is open, means upstream of the valve and operable to displace air to flow downstream against and tending to close the valve, and means for increasingly yieldably resisting said valve pivotal movement as the valve pivots to close said main orifices, said assembly forming auxiliary orifice means at the valve for passing air flowing from the upstream side to the downstream side thereof, said auxiliary orifice means being sized to pass the flow supersonically when the main orifices are closed in response to sufficient air displacement downstream and against the valve, the flow area of said auxiliary orifice means remaining substantially independent of pivotal movement of said valve as the valve approaches closed position, whereby as said differential air pressure increases the mass flow of air through said conduit remains substantially constant.

5. The invention as defined in claim 4 in which transversely spaced opposite edges of the valve cooperate with the conduit bore to form a pair of auxiliary orifices.

6. The invention as defined in claim 4 in which said auxiliary orifice means is formed by the valve and is spaced from all the edges of said valve.

References Cited in the file of this patent

UNITED STATES PATENTS

| | | |
|---|---|---|
| 2,235,838 | Martin | Mar. 25, 1941 |
| 2,347,830 | Kiburz et al. | May 2, 1944 |
| 2,932,444 | Walker | Apr. 12, 1960 |

FOREIGN PATENTS

| | | |
|---|---|---|
| 495,538 | Italy | June 18, 1954 |